(12) United States Patent
Frech et al.

(10) Patent No.: US 7,250,812 B2
(45) Date of Patent: Jul. 31, 2007

(54) INTEGRATED CIRCUIT CURRENT REGULATOR

(75) Inventors: Roland Frech, Ostfildern (DE); Bernd Garben, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 10/908,289

(22) Filed: May 5, 2005

(65) Prior Publication Data

US 2005/0248390 A1 Nov. 10, 2005

(30) Foreign Application Priority Data

May 5, 2004 (DE) ............... 041 01 937

(51) Int. Cl.
*G05F 1/10* (2006.01)
(52) U.S. Cl. ...................... 327/541; 323/312
(58) Field of Classification Search ......... 327/540–541
See application file for complete search history.

(56) References Cited

U.S. PATENT DOCUMENTS

| | | | | |
|---|---|---|---|---|
| 5,107,199 A | * | 4/1992 | Vo et al. ............... | 323/316 |
| 5,929,621 A | * | 7/1999 | Angelici et al. ........ | 323/313 |
| 5,933,051 A | * | 8/1999 | Tsuchida et al. ........ | 327/543 |
| 6,018,265 A | * | 1/2000 | Keshtbod ............. | 327/540 |
| 6,232,753 B1 | * | 5/2001 | Pasotti et al. ......... | 323/267 |
| 2004/0150464 A1 | * | 8/2004 | Khalid ............... | 327/541 |
| 2006/0006928 A1 | * | 1/2006 | Utsuno .............. | 327/541 |
| 2006/0082412 A1 | * | 4/2006 | D'Angelo et al. ....... | 327/541 |

* cited by examiner

*Primary Examiner*—Kenneth B. Wells
*Assistant Examiner*—Ryan Jager
(74) *Attorney, Agent, or Firm*—W. Riyon Harding

(57) ABSTRACT

An integrated circuit current regulator that compensates for variation in current required based on the switching activity of the integrated circuit. A first embodiment incorporates a voltage controlled on-chip bypass circuit with a scaling unit to divide an input voltage into n fractional voltages and an on-chip voltage monitor to compare a fraction of the on-chip supply voltage with a reference voltage and control a corresponding on-chip power supply bypass. At least one bypass resistor per comparator is switched between the supply voltage and ground potential according to the output signal of the corresponding comparator to dampen power supply noise. The value of the by-pass resistance R increases with decreasing on-chip supply voltage and decreases with increasing supply voltage. A resistance as a function of supply voltage R(Vdd) characteristic is realized to reduce or eliminate mid-frequency power supply noise, caused by on-chip switching activity variations while minimizing additional on-chip power dissipation.

13 Claims, 3 Drawing Sheets

INTEGRATED CIRCUIT CURRENT REGULATOR

FIELD OF THE INVENTION

The present invention relates to an integrated circuit designed to compensate for fluctuations in current of an on-chip power supply related to switching activity of the integrated circuit and more particularly to a power supply current by-pass circuit controlled by a power supply voltage monitor.

BACKGROUND OF THE INVENTION

As integrated circuit clock frequencies and circuit densities continue to scale dramatically upward, the importance of a stable power supply voltage becomes critical for reliable operation. Power supply current demand and therefore voltage fluctuation is affected by changes in power consumption on the chip. Sustained changes of on-chip switching activity for more than one clock cycle change the average current demand (ΔI) of CMOS chips and create power voltage noise in the mid-and low frequency range. Thus, switched bypass resistors are often connected directly to the power supply.

The power supply noise is created because the power supply and voltage regulation functions are physically displaced from the chip, resulting in additional power loading on the power supply. Chip modules, circuit card assemblies (CCA) and printed circuit boards (PCB) often combine to present a complex distribution network for on-chip power supply regulation. The un-avoidable inductances in the power delivery network routed from the power supply to the on-chip circuits are a primary source of power supply noise. Increased switching activity causes a drop of the on-chip supply voltage and decreasing switching activity can result in voltage supply overshoot. The on-chip voltage fluctuations are attributable to high switching activity of a large percentage of active devices and their corresponding capacitive loads. This type of fluctuation in power supply voltage tends to occur over a period of about 5 nanoseconds.

Power supply noise impacts chip performance and can cause false switching in logic circuits. Power supply noise becomes more and more critical with increasing ΔI and decreasing supply voltage because noise margins for low voltage circuits are commensurately reduced.

Large leakage currents in the range of about 70 A can operate to reduce power supply noise in CMOS integrated circuits due to a damping effect in supply perturbations and also because of the relatively small dependency of the supply voltage to leakage resistance. However, in current process technologies, leakage currents present a major source of power dissipation as well as unique challenges to chip cooling, thereby mitigating any reliance on leakage currents as a means for reducing power supply noise.

Another common practice to reduce power supply noise is to place decoupling capacitors on-chip as well as on the module, CCA or PCB. On-chip decoupling capacitors are most efficient for mid-frequency power supply noise reduction, but the total amount of decoupling capacitance is limited by the chip size. Moreover, the path inductances of the power delivery network and of the decoupling capacitors themselves are reduced by appropriate design and technology. However, low inductance capacitors (LICA) placed on the module are significantly more expensive than general purpose capacitors.

SUMMARY OF THE INVENTION

It is an object of the invention to provide a more stable power supply voltage to on-chip circuitry and to reduce spurious noise on the power distribution network between the power supply and the chip. These and other objects and advantages are achieved by the voltage controlled on-chip bypass circuitry of an integrated circuit according to the appended claims.

An on-chip current regulator is disclosed that compensates for variation in power supply output current due to switching activity of the integrated circuit. A first embodiment is directed to an on-chip power supply by-pass circuit controlled by a voltage monitor. The power supply bypass circuit compensates for fluctuations in power supply current caused by a number of factors, including logic switching, clock gating, voltage domain switching and reduced power dissipation modes. Those skilled in the art will readily appreciate that the crux of the invention is a circuit that correlates switching activity with current demand to regulate the power supply and that a variety of different embodiments and compensation schemes are possible.

The first embodiment includes a voltage controlled on-chip bypass circuit with a scaling unit for the current on-chip supply voltage to provide at least two fractions of the supply voltage; an array of at least two comparators each processing one of the fractional supply voltages and a reference voltage; and at least one bypass resistor per comparator is switched between the supply voltage and ground according to the output signal of the comparator. The scaling unit can be implemented with a series network of resistors to derive the fractional supply voltages. The bypass resistor can be switched by a transistor driven by the output signal of the comparator.

The on-chip voltage monitor compares a fraction of the on-chip supply voltage with a reference voltage and controls a corresponding on-chip power supply bypass. The value of the by-pass resistance R increases with decreasing on-chip supply voltage and decreases with increasing supply voltage. The invention describes how the appropriate resistance as a function of supply voltage R(Vdd) characteristic is realized to reduce or eliminate mid-frequency power supply noise, which is caused by on-chip switching activity variations while at the same time minimizing any additional on-chip power dissipation.

BRIEF DESCRIPTION OF THE DRAWINGS

The subject matter that is regarded as the invention is particularly pointed out and distinctly claimed in the concluding portion of the specification. The invention together with further objects and advantages thereof may be best understood by reference to the following description taken in connection with the accompanying drawings in which:

DETAILED DESCRIPTION OF THE PREFERRED EMBODIMENTS

Figure 1:
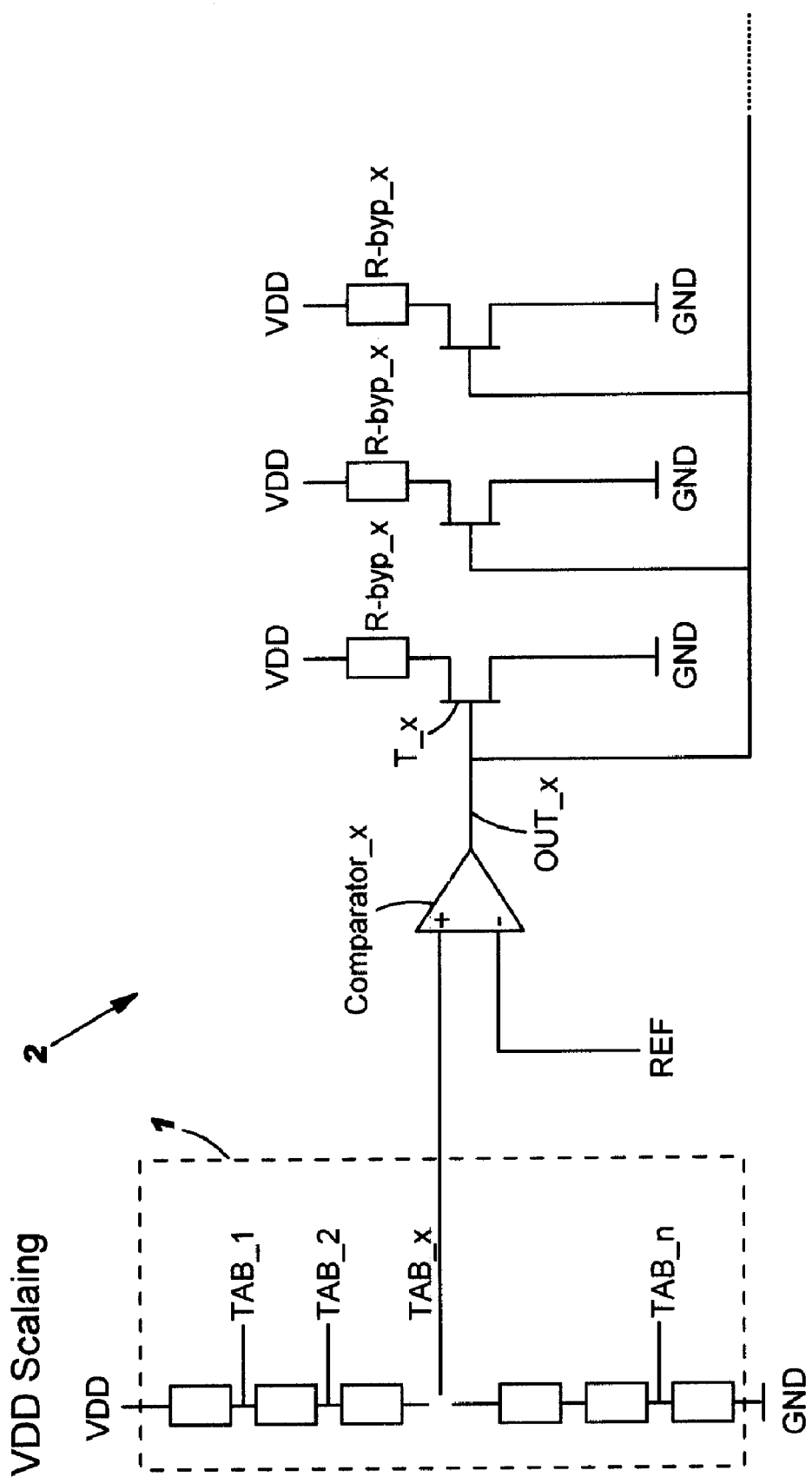
FIG. 1 depicts a schematic circuit diagram according to a first embodiment of the integrated circuit current regulator.

In FIG. 1, a voltage controlled on-chip bypass circuit is shown with a scaling unit 1 and an array 2 of comparators (only one shown) according to a first embodiment of the invention. Scaling unit 1 provides n discrete multiples TAB_1 to TAB_n of the current on-chip supply voltage VDD. Scaling unit 1 is implemented with a series network of Ohmic resistors R0 to Rn providing the fractional supply voltages TAB_1 to TAB_n at their respective connection tap points. The values of resistors R0 to Rn of scaling unit 1 are chosen so that the supply voltage is scaled with a granularity of about 10 mV per increment. Array 2 of n comparators corresponds to the number of fractional supply voltages TAB_1 to TAB_n. Comparator_1 to Comparator_n each process a result of a compare operation between one of the fractional supply voltages TAB_1 to TAB_n and a reference voltage REF. The output OUT_x of each comparator Comparator_x is connected to the gates of a pair of transistors T_x, each switching a bypass resistor R_byp_x between the on-chip supply voltage VDD and ground GND according to the output signal OUT_x obtained from the comparison of the accompanying fractional supply voltage TAB_x with the reference voltage. For simplicity of illustration, only a single comparator row (x) with corresponding switched coupled bypass resistors is shown in FIG. 1.

The power supply bypass circuit herein represents an effective on-chip power supply bypass resistance network with a R(U) characteristic that can be further optimized according to the actual chip and package parasitic and switching loads.

Figure 2:
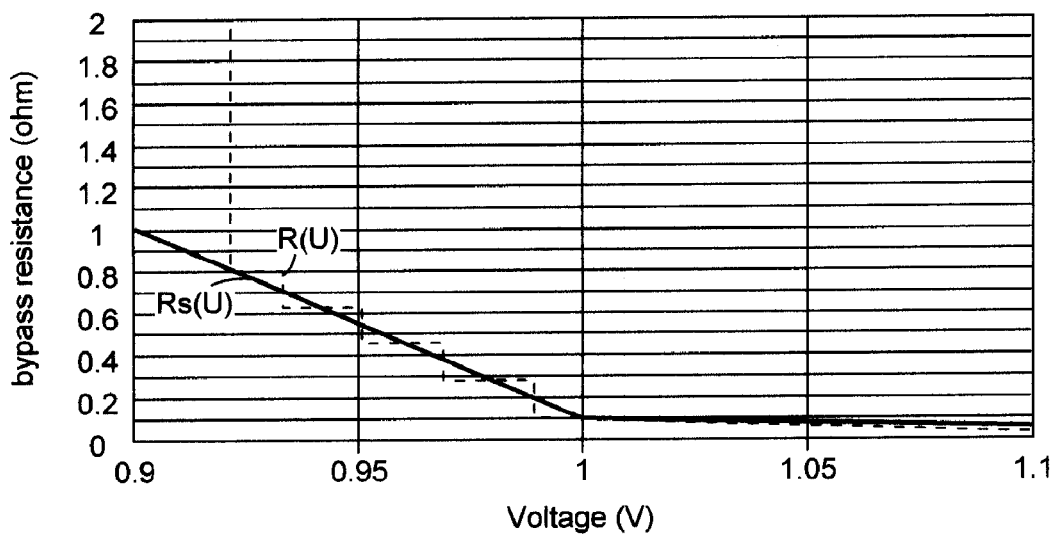
FIG. 2 plots the resulting dependency function of the bypass resistor value over the on-chip supply voltage corresponding to the circuit of FIG. 1.

FIG. 2 plots an idealized response of the supply voltage as a function of the bypass resistance together with an actual response according to the first embodiment of the invention. The smooth idealized curve Rs(U) approximates the dependency over the bypass resistor value over the on-chip supply voltage. The actual response characteristic can have many steps according to the chosen number of fractional voltage values, n. In general, the bypass current at nominal voltage VDD varies within a range of about 40% to 100% of the maximum $\Delta I$ (e.g. 10 A at a supply voltage of 1V in FIG. 2). Increased bypass current yields smaller mid-frequency noise levels. The bypass resistance R(U) increases with a decreasing on-chip voltage under the nominal value and approaches infinity at the maximum expected voltage drop, when all bypass paths are switched off. For the response shown in FIG. 2, the bypass resistance R(U) increases by a factor of eight and then approaches infinity when the on-chip voltage decreases from 1V to 0.9V. The bypass resistance R(U) decreases with an increase in the on-chip supply voltage over the nominal value by a factor of two when the on-chip voltage increases from VDD to the maximum expected voltage overshoot.

Figure 3:
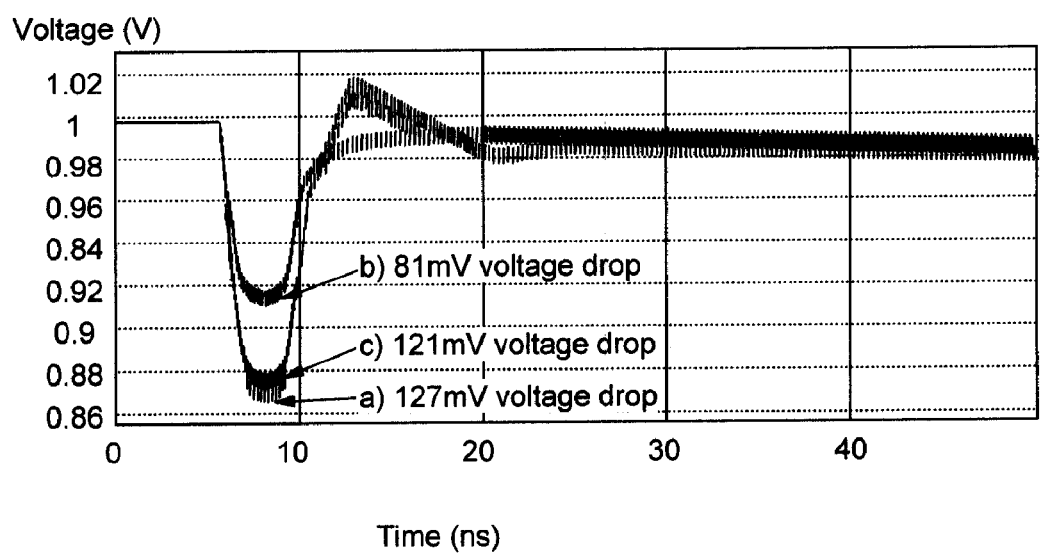
FIG. 3 plots the difference in voltage response due to variation in on-chip switching activity for three cases. (a. no bypass; b. power supply bypass of the present invention; and c. single resistor bypass circuit.)

In FIG. 3, a calculated example of the effect of the voltage controlled on-chip power bypass circuitry is plotted for a 20 A $\Delta I$, 70 A continuous switching (clocks, etc), zero leakage currents, VDD=1V nominal voltage and a bypass characteristic Rs(U) as shown in FIG. 2 with 8.5 A bypass current at 0.998V. The noise response of the power supply is plotted for three different circuit configurations corresponding to a variable resistance bypass, no bypass and a constant resistor bypass, labelled as curves a, b and c, respectively in FIG. 2. For the case of the variable bypass resistance, the bypass current at nominal voltage is 42.5% of $\Delta I$. Due to the increased switching activity at t=5 ns and the resulting drop of the on-chip supply voltage, the bypass current decreases almost to zero, which has the same effect as if $\Delta I$ had been reduced by approx. 8.5 A. As a result, the voltage drops by only 81 mV (FIG. 3, curve b), whereas the voltage drop equals 127 mV without the voltage controlled on-chip power bypass enabled (FIG. 3, curve a). The constant resistance bypass response c indicates a voltage drop of 121 mv, which is only marginally improved over the response without a voltage supply bypass circuit. Therefore, a significant reduction of mid-frequency power supply noise (36% in this example) can only be achieved with a voltage dependent bypass resistance network and not with a constant bypass resistor (FIG. 3, curve c).

Another aspect of the invention is the realization of a reduction in mid-frequency power supply noise with only a small increase of the overall chip power dissipation (nominal current increases by 40%-100% of $\Delta I$, whereas leakage presently almost doubles the total functional current). Accordingly, the degree of mid-frequency power supply noise reduction is increased by improving the bypass regulation loop and/or increasing the bypass current at nominal voltage.

With the variable bypass resistance feature, the power supply bypass circuit disclosed herein provides improved power supply stability, because the mid-frequency power supply noise may be effectively cancelled with a limited amount of on-chip decoupling capacitance. As such, for noise tolerances within a range of about 60 mV, much lower values of on-chip decoupling capacitance are required for mid-frequency power noise reduction, e.g. 600 nF instead of 2300 nF. In current process technologies 2300 nF would require approximately 31 cm$^2$ of silicon area (assuming 750 pF/mm$^2$), thereby consuming an unreasonably large percentage of total die area. Consequently, providing 2300 nF of on-chip decoupling capacitance is not practical. As a result, other solutions are required to suppress power supply noise in integrated circuits. In comparison, the additional area required for the voltage controlled on-chip power bypass circuits disclosed herein is relatively small.

The power supply bypass circuit with variable resistance of the first embodiment consumes less area and has a positive effect on manufacturing costs because module capacitors with higher inductance (ESL) can be used, e.g. IDC decoupling capacitors instead of LICA decoupling capacitors because the impact of the loop inductance is reduced.

Furthermore a reduced slope of the R(U) characteristic in the range of normal variations of the nominal on-chip voltage (e.g. Vdd +/−5 mV) can be exploited to obtain the desired bypass current for the nominal voltage.

A PI-regulator (proportional integral) or P-regulator (proportional) can be used in conjunction with the bypass resistor network to reduce the mid-frequency power supply noise. While the P-regulator retains an irreducible component of error in the output, the proportional-integral approach enables the power supply voltage to approach a constant output with minimal current variation.

A distribution of the bypass current over the complete chip area is possible, if the chip activity variations are homogeneously distributed (as in case of the simulated example), this, in turn, leads to a homogenous temperature distribution.

VDD voltage scaling and bypass resistor arrays can potentially be repeated independently in several chip areas to fine-tune the granularity of local bypass current very close to thermal hot-spot regions on the die.

For integrated circuits employing multiple voltage domains a separate voltage controlled on-chip power bypass scheme for each voltage domain may be implemented.

Figure 4:
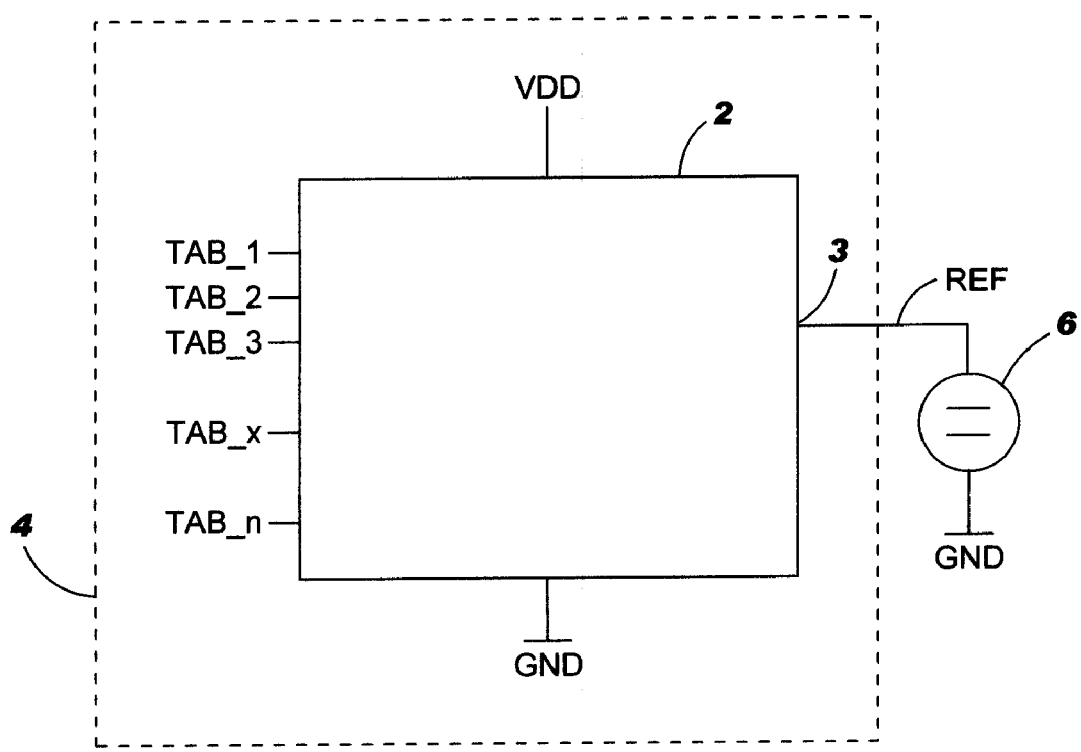
FIG. 4 shows a schematic block diagram of the comparator array using an external reference voltage supply.

FIG. 4 shows a schematic block diagram of the comparator array 2 using an off-chip reference voltage supply 6 to generate the reference voltage REF. It is also possible to implement a voltage reference on the same chip 4 in cooperation with the bypass circuitry.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, equivalents, modifications and variations as falling within the true scope and spirit of the present invention.

What is claimed is:

1. An integrated circuit current regulator capable of varying a first current in accordance with a switching activity of the integrated circuit, comprising:
a compensation circuit comprising a bypass circuit and a comparator coupled to the bypass circuit, the compensation circuit regulates the first current;
the comparator providing a control signal corresponding to the switching activity; and
a scaling unit coupled to the comparator and capable of dividing a first voltage into a plurality of n fractional voltages of the first voltage;
wherein the compensation circuit further comprises:
the comparator coupled to a tap point of the scaling unit corresponding to one of the plurality of n fractional voltages, the comparator capable of determining whether the one of the n fractional voltages is greater than or less than a reference voltage and generating a compare output signal;
a switch device driven by the compare output signal;
a bypass resistor coupled to the switch device and to a power supply voltage, the bypass resistor capable of regulating fluctuations in the power supply voltage; and
the current regulator further comprising a plurality of comparators, each coupled to a corresponding tap point of the scaling unit and capable of determining whether one of the n fractional voltages is greater than or less than the reference voltage.

2. The current regulator according to claim 1, further comprising an array of bypass resistors coupled to at least one of the plurality of comparators through a plurality of corresponding switch devices.

3. The current regulator according to claim 1, wherein the plurality of comparators comprises a plurality of differential amplifiers.

4. The current regulator according to claim 1, wherein the scaling unit comprises a plurality of series coupled resistors (R0, . . . , Rn), providing the plurality of n fractional power supply voltages.

5. The current regulator according to claim 4, wherein each of the plurality of series coupled resistors comprises an Ohmic resistor.

6. The current regulator according to claim 4, wherein the value of each of the resistors (R0, . . . , Rn) is selected to provide a gradation of about 10 mV between each of the n fractional power supply voltages.

7. The current regulator according to claim 6, wherein the value of a switched by-pass resistance is inversely proportional to the value of the power supply voltage such that the by-pass resistance increases with a decreasing power supply voltage and the by-pass resistance decreases with an increasing power supply voltage.

8. The current regulator circuit according to claim 1, wherein the reference voltage is generated by an external (off-chip) voltage source.

9. The voltage controlled power supply bypass circuit according to claim 1, wherein the switch device comprises a MOSFET.

10. A method of reducing noise in an integrated circuit power supply, the method comprising:
dividing a power supply voltage into a plurality of n fractional voltages of the power supply voltage;
comparing each one of the n fractional voltages of the power supply voltage to a reference voltage and generating a corresponding compare output signal;
providing at least one switch device driven by the corresponding compare output signal; and
regulating the power supply voltage by switching between the power supply voltage and ground, wherein at least one by-pass resistor is coupled to the at least one switch device.

11. The method according to claim 10 further comprising providing an array of comparators, each coupled to a corresponding tap point of the scaling unit and capable of determining whether one of the n fractional voltages is greater than or less than the reference voltage.

12. The method according to claim 10 further comprising controlling the value of a switched by-pass resistance such that the by-pass resistance increases with a decreasing power supply voltage and the by-pass resistance decreases with an increasing power supply voltage.

13. The method according to claim 10 further comprising selecting a value of each of the plurality of by-pass resistors to provide a gradation of about 10 mV between each of the n fractional power supply voltages.

* * * * *